United States Patent
Diab

(10) Patent No.: US 8,281,173 B2
(45) Date of Patent: Oct. 2, 2012

(54) SYSTEM AND METHOD FOR ENABLING FALLBACK STATES FOR ENERGY EFFICIENT ETHERNET

(75) Inventor: Wael William Diab, San Franciso, CA (US)

(73) Assignee: Broadcom Corporation, Irvine, CA (US)

( * ) Notice: Subject to any disclaimer, the term of this patent is extended or adjusted under 35 U.S.C. 154(b) by 585 days.

(21) Appl. No.: 12/437,928

(22) Filed: May 8, 2009

(65) Prior Publication Data

US 2010/0235665 A1    Sep. 16, 2010

Related U.S. Application Data

(60) Provisional application No. 61/159,472, filed on Mar. 12, 2009.

(51) Int. Cl.
*G06F 1/00* (2006.01)
(52) U.S. Cl. ...................................... 713/323
(58) Field of Classification Search .................... 713/323
See application file for complete search history.

(56) References Cited

U.S. PATENT DOCUMENTS

2004/0088590 A1* 5/2004 Lee et al. ...................... 713/300

OTHER PUBLICATIONS

EP Search Report, Sep. 20, 2010.
Draft Amendment to IEEE Std 802.3-2008, D1.0, IEEE 802.3az Energy Efficient Ethernet Task Force, Nov. 2008.
Wael William Diab, 802.3az Task Force Layer 2 Ad-Hoc Report, Version 1.1, Apr. 29, 2009.
Wael William Diab, 802.3az Jan. 9 Interim: LLDP's Use in EEE, Version 1.0, Jan. 2009.
Diab et al., 802.3az Task Force L2 Fallback States Enhancement, Version 1.2, Apr. 2009.
Diab et al., Draft Amendment to IEEE Std 802.3-2008, D1.3, IEEE 802.3az Energy Efficient Ethernet Task Force, May 2009.

* cited by examiner

*Primary Examiner* — Paul R Myers
*Assistant Examiner* — Jeremy S Cerullo
(74) *Attorney, Agent, or Firm* — Duane S. Kobayaschi

(57) ABSTRACT

A system and method for enabling fallback states for energy efficient Ethernet (EEE). EEE devices can be designed to support multiple power saving states that impact layers higher than the PHY layer. Typically, these higher levels of power savings would require a greater period of time to accommodate a return to an active state. In a dynamic negotiation process, the receiving device can advertise multiple fallback power saving states to the transmitting device. The transmitting device's allocation of buffering can then determine which of the power saving states would be supported.

14 Claims, 5 Drawing Sheets

SYSTEM AND METHOD FOR ENABLING FALLBACK STATES FOR ENERGY EFFICIENT ETHERNET

This application claims priority to provisional application No. 61/159,472, filed Mar. 12, 2009, which is incorporated by reference herein, in its entirety, for all purposes.

BACKGROUND

1. Field of the Invention

The present invention relates generally to energy efficient Ethernet (EEE) and, more particularly, to system and method for enabling fallback states for EEE.

2. Introduction

Energy costs continue to escalate in a trend that has accelerated in recent years. Such being the case, various industries have become increasingly sensitive to the impact of those rising costs. One area that has drawn increasing scrutiny is the IT infrastructure. Many companies are now looking at their IT systems' power usage to determine whether the energy costs can be reduced. For this reason, an industry focus on energy efficient networks has arisen to address the rising costs of IT equipment usage as a whole (i.e., PCs, displays, printers, servers, network equipment, etc.).

In designing an energy efficient solution, one of the considerations is the traffic profile on the network link. For example, many network links are typically in an idle state between sporadic bursts of data, while in other network links, there can be regular or intermittent low-bandwidth traffic, with bursts of high-bandwidth traffic. An additional consideration for an energy efficient solution is the extent to which the traffic is sensitive to buffering and latency. For example, some traffic patterns (e.g., HPC cluster or high-end 24-hr data center) are very sensitive to latency such that buffering would be problematic. For these and other reasons, applying energy efficient concepts to different traffic profiles would lead to different solutions. These varied solutions can therefore seek to adapt the link, link rate, and layers above the link to an optimal solution based on various energy costs and impact on traffic, which itself is dependent on the application.

As would be appreciated, an EEE solution can involve various layers. For example, an EEE mechanism can be implemented in a physical layer device (PHY) to transition the PHY between various energy states. Additional power savings can also be realized in the MAC and upper layers. What is needed therefore is a mechanism that enables coordination across an EEE link to accommodate various levels of power savings.

SUMMARY

A system and/or method for enabling fallback states for energy efficient Ethernet, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
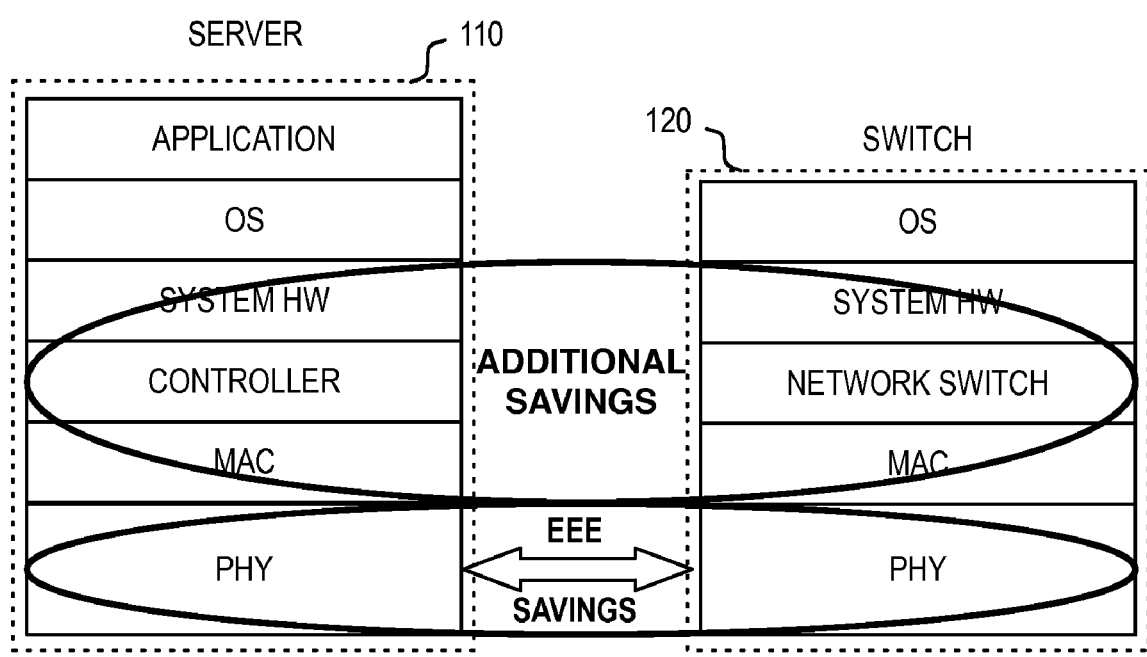
FIG. 1 illustrates an example of a network link.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Ethernet has become an increasingly pervasive technology that has been applied in various contexts (e.g., twisted pair, backplane, etc.). IEEE 802.3az Energy Efficient Ethernet (EEE) continues to evaluate various methods for reducing energy used during periods of low link utilization. In this process, a protocol can be defined that would facilitate transition to and from lower power consumption modes in response to changes in network demand.

In general, a reduction in link rate to a sub-rate of the main rate enables a reduction in power, thereby leading to energy savings. In one example, this sub-rate can be a zero rate, which produces maximum power savings.

One example of subrating is through the use of a subset PHY technique. In this subset PHY technique, a low link utilization period can be accommodated by transitioning the PHY to a lower link rate that is enabled by a subset of the parent PHY. In one embodiment, the subset PHY technique is enabled by turning off portions of the parent PHY to enable operation at a lower or subset rate. For example, a subset 1 G PHY can be created from a parent 10 GBASE-T PHY by a process that turns off three of the four channels. In another embodiment, the subset PHY technique is enabled by slowing down the clock rate of a parent PHY. For example, a parent PHY having an enhanced core that can be slowed down and sped up by a frequency multiple can be slowed down by a factor of 10 during low link utilization, then sped up by a factor of 10 when a burst of data is received. In this example of a factor of 10, a 10 G enhanced core can be transitioned down to a 1 G link rate when idle, and sped back up to a 10 G link rate when data is to be transmitted.

Another example of subrating is through the use of a low power idle (LPI) technique. In general, LPI relies on turning the active channel silent when there is nothing to transmit. Energy is thereby saved when the link is off. Refresh signals can be sent periodically to enable wake up from the sleep mode. In one embodiment, a sync signal can be used on the interfaces (i.e., medium dependent interface (MDI) and PHY/medium access control (MAC) interface) to allow for a quick wake up from the sleep mode and maintain frequency lock. For example, on the MDI interface for a 10 GBASE-T signal, a simple PAM2 pseudorandom bit sequence could be used on pair A during LPI mode. This would not significantly increase the power that is consumed.

In general, both the subset and LPI techniques involve turning off or otherwise modifying portions of the PHY during a period of low link utilization. As would be appreciated, control of the power consumption mode transition process can be in the PHY, MAC, MAC control, MAC client, or higher layers such as the application layer. As in the PHY, power savings in the higher layers can also be achieved by using various forms of subrating as well.

To further illustrate the power savings that can be realized, reference is now made to the example link between a server and a switch in FIG. 1. As illustrated, server 110 contains various layers including PHY, MAC, controller, system HW, operating system (OS), and application layers.

Figure 2:
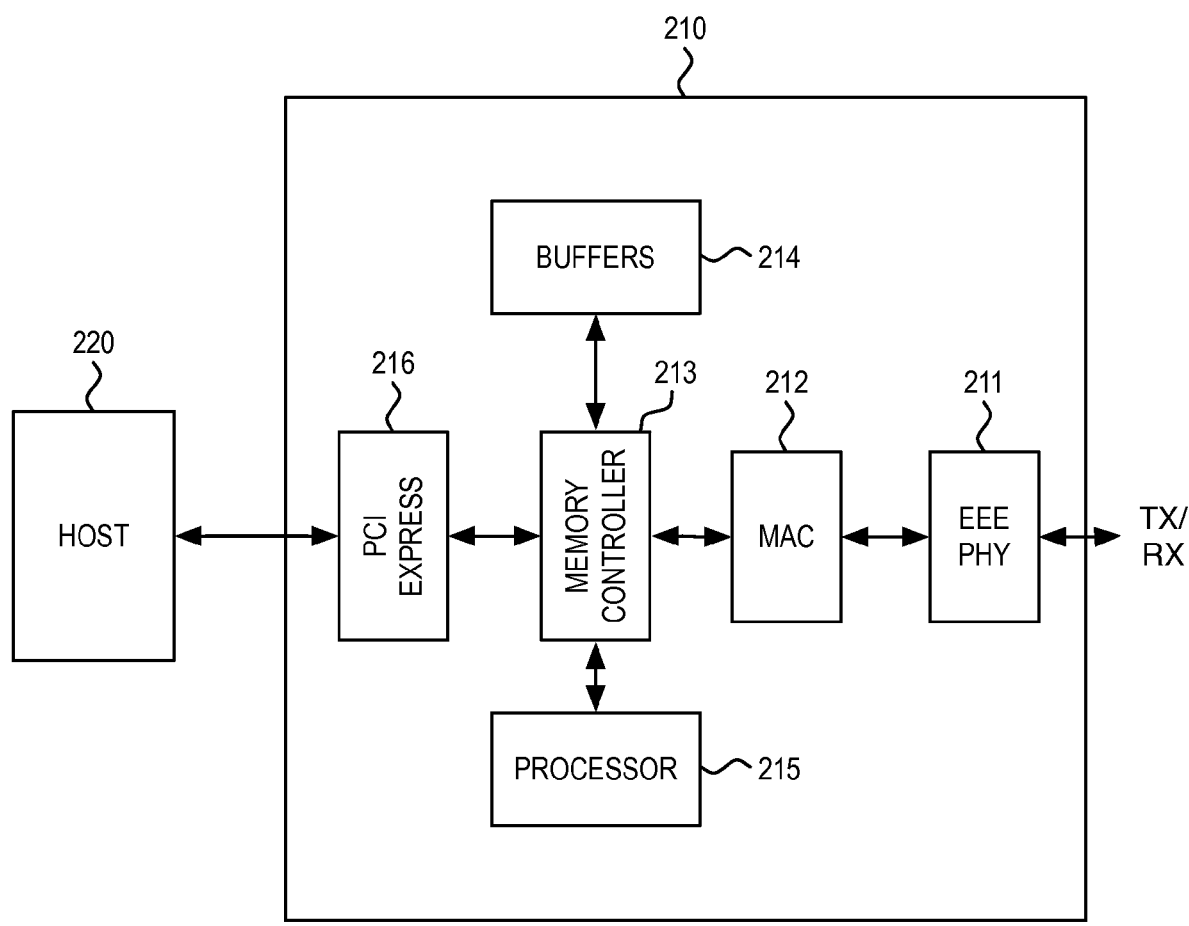
FIG. 2 illustrates an example of a controller.

FIG. 2 illustrates an example of a controller system that can be part of a client (e.g., laptop, desktop or workstation), a server (e.g., audio-video (AV) server, high performance computing (HPC) server), or a consumer edge device (e.g., HDTV, Blu-ray, etc.). As illustrated, host system 220 is coupled to integrated Ethernet controller 210. Ethernet controller 210 further includes PHY 211, which is coupled to MAC 212. In the illustrated example, MAC 212 is coupled to PCI Express device 216 via memory controller 213, which is also coupled to buffers 214 and processor 215.

Switch 120 is similar to server 110. As illustrated, switch 120 contains various layers including PHY, MAC, network switch, system hardware (HW), and operating system (OS) layers.

Figure 3:
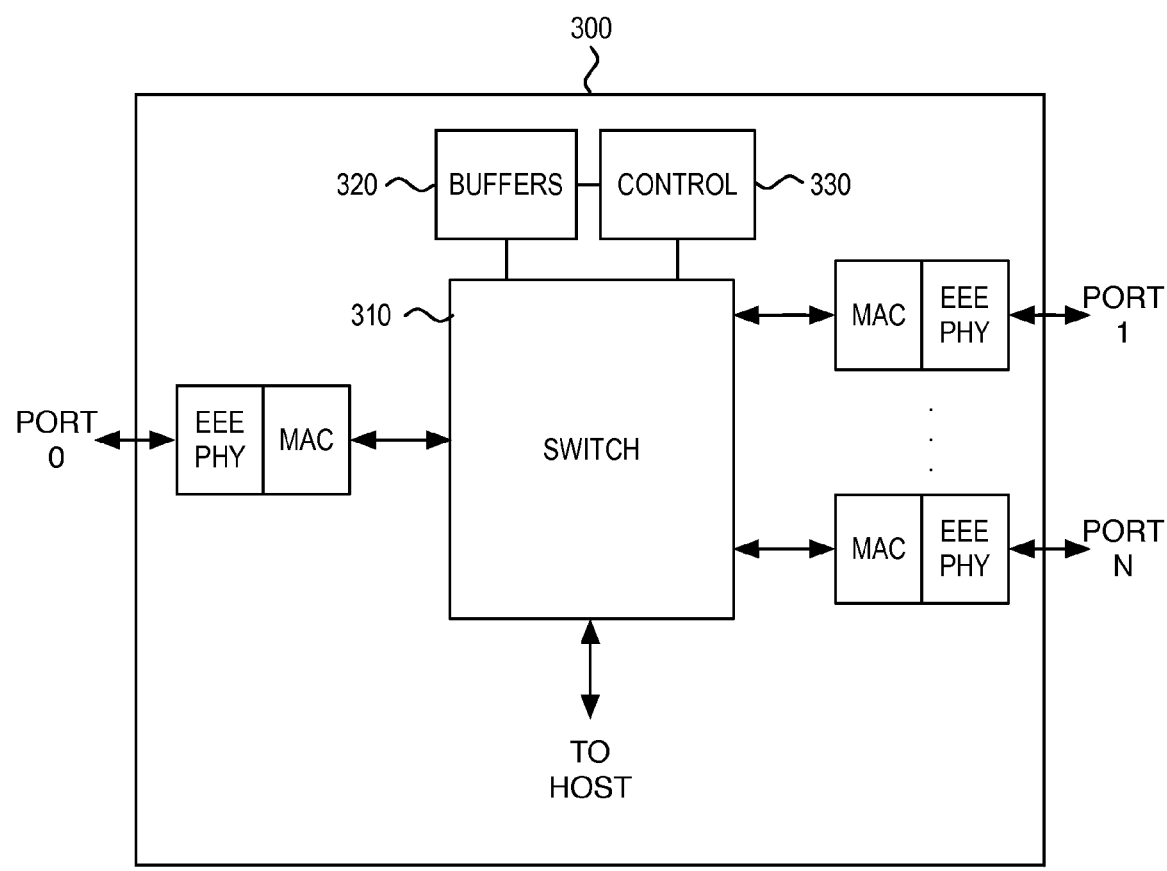
FIG. 3 illustrates an example of a switch.

FIG. 3 illustrates an example switching system 400 that can represent a router or any other device that incorporates multi-port switch functionality. In various examples, the switch can be a consumer, SMB, enterprise, metro, or access switch. In another example, switching system 300 can represent a voice over IP (VoIP) chip that has a network interface (Port 0) and a PC interface (Port 1). In yet another example, switching system 300 can represent a customer premise equipment (CPE) device in a service provider access network that can have an optical central office (CO) facing interface (Port 0) and multiple interfaces (Ports 1-N) that are facing the home and/or gateway (e.g., the CPE can simply be a media converter and/or part of the home gateway). Still further, switching system 300 can represent an access point such as a WLAN base station. As illustrated, switching system 300 includes switch 310 that supports an internal port and a plurality of external ports 0-N via MAC and PHY interfaces. Switch 310 is also supported by buffers 320 and control 330.

Referring again to the illustration of FIG. 1, EEE savings are typically realized in the PHY layer (e.g., EEE PHYs illustrated in FIGS. 2 and 3). Potential power savings need not be confined, however, to the PHY layer. As illustrated in FIG. 1, additional power savings can also be realized in layers above the PHY.

For example, in server 110, additional power savings can be realized in the MAC, controller, and system HW layers. This reflects the reality that systems are very complex and can have various power states defined for various components or for the system as a whole. These various defined power states can implement various forms of subrating to enable all or part of the system to enter into sleep or other low-power states. For example, in an edge device, the PCI, the entire Southbridge and/or even sections of the CPU and its associated memory can be designed to enter a sleep state, thereby generating additional power savings beyond the PHY.

Similarly, in switch 120, additional power savings can be realized beyond the PHY through subrating as well. For example, power savings can be achieved by turning off the MAC as well as disabling logic relating to switching, routing, memory and/or associated logic.

While the additional power savings generated by powering down higher layer elements represent a tremendous benefit, the tradeoff of such a benefit is the increased time needed to wake up from the power savings state. This wake-up time from a particular power saving state represents the amount of time that is needed before the intelligence (above the PHY) is prepared to process packets on the Ethernet link. For example, waking up a PHY may take at least 30 µs, while waking up a PHY/MAC interface may take 100 µs. These wake-up times are relatively benign when compared to the millisecond-range time it can take to wake up a PCI express or southbridge.

In EEE, asymmetric operation would dictate that the transmitting device is responsible for accommodating the receiving device. In this accommodation of the power saving state at the receiving device, the transmitting device would need to hold off on transmitting data until the receiving device has completed the wake-up process. This delay in holding off transmission can be enabled through the use of dynamic buffering at the transmitting device.

In general, buffering at the transmitting device can represent a scare resource. This is especially true where the transmitting device is a multi-port device that is responsible for allocating a limited amount of buffering to the various ports. The amount of buffering that is allocated to a port would have a direct correlation to the amount of time that the transmitting device can hold off from transmitting data on that port. The amount of buffering represents one of the variables in establishing the type of power savings that can be achieved on a link.

Another variable is the particular power saving states that are available to the receiving device. For example, the controller system of FIG. 2 can be part of a client such as a laptop, desktop or workstation, a server such as an AV server or HPC server, or a consumer edge device such as an HDTV or Blu-ray player. Each of these devices can define a plurality of component and system power saving states that have wake-up times that are implementation dependent. For example, the wake-up times can depend on the amount of buffering on ingress.

Due to the low likelihood of standardization amongst even a single class of devices (e.g., HDTVs), there is no way to predict an expected range of wake-up times that should be supported by buffering at the transmitting device. This results because the wake-up times for the same set of power saving states would be dependent on the particular design chosen by the manufacturer.

One possibility is to attempt to support a worst case wake-up time to accommodate the maximum number of devices. This worst-case design option would be wasteful, however, in consideration of the increases in cost of the buffering needed to support the worst case wake-up time. Here, the increased costs would produce diminishing marginal returns.

In the present invention, it is recognized that a particular set of link partners would need to consider variables on both ends of the link before the power saving options are chosen. As these variables would be implementation dependent, standardized configuration routines are unlikely.

To illustrate the principles of the present invention, consider a scenario where the transmitting device is paired with a receiving device that offers a range of power savings that corresponds to a respective range of wake-up times. Here, the receiving device can have a 30 µs wake-up time for the PHY, a 100 µs wake-up time for the PHY/MAC interface, a 1 ms wake-up time for the PCI express, and a 2 ms wake-up time for the southbridge.

Ideally, the transmitting device can support all of these wake-up times for the receiving device. It may often be the case due to available buffering, however, that the transmitting device can only support a wake-up time of 200 µs for that particular port. In this example, the transmitting device could therefore accommodate the PHY and PHY/MAC power saving states but could not accommodate the PCI express and southbridge power saving states.

In the present invention, it is recognized that the range of devices that can be intermixed will likely lead to a minimum of power savings. Here, it is quite possible that power savings may be limited to the PHY, as it represents a lowest cost denominator approach. It is therefore a feature of the present invention that a dynamic, efficient negotiation process between a transmitting and receiving device can be used to produce an optimal solution for power savings and buffer allocation. Here, the optimal solution would represent the solution that represents the maximum amount of power savings for a particular pairing of devices. As such, the dynamic negotiation process is focused on the capabilities of the particular pair of devices. As will be described in greater detail below, the dynamic negotiation process with fallback states is also efficient in that it reduces the amount of messaging in the negotiation, thereby removing unnecessary overhead on the link.

In the present invention, the dynamic negotiation process is accommodated by the use of fallback states. These fallback states are designed to enable identification of the maximum power savings for a given pair of devices. In one embodiment, the fallback states define discrete operating states for a device, and can be characterized by the different wake-up times for the particular power saving states. As such, the fallback states can be used to represent different levels of functionality in a device.

Figure 4:
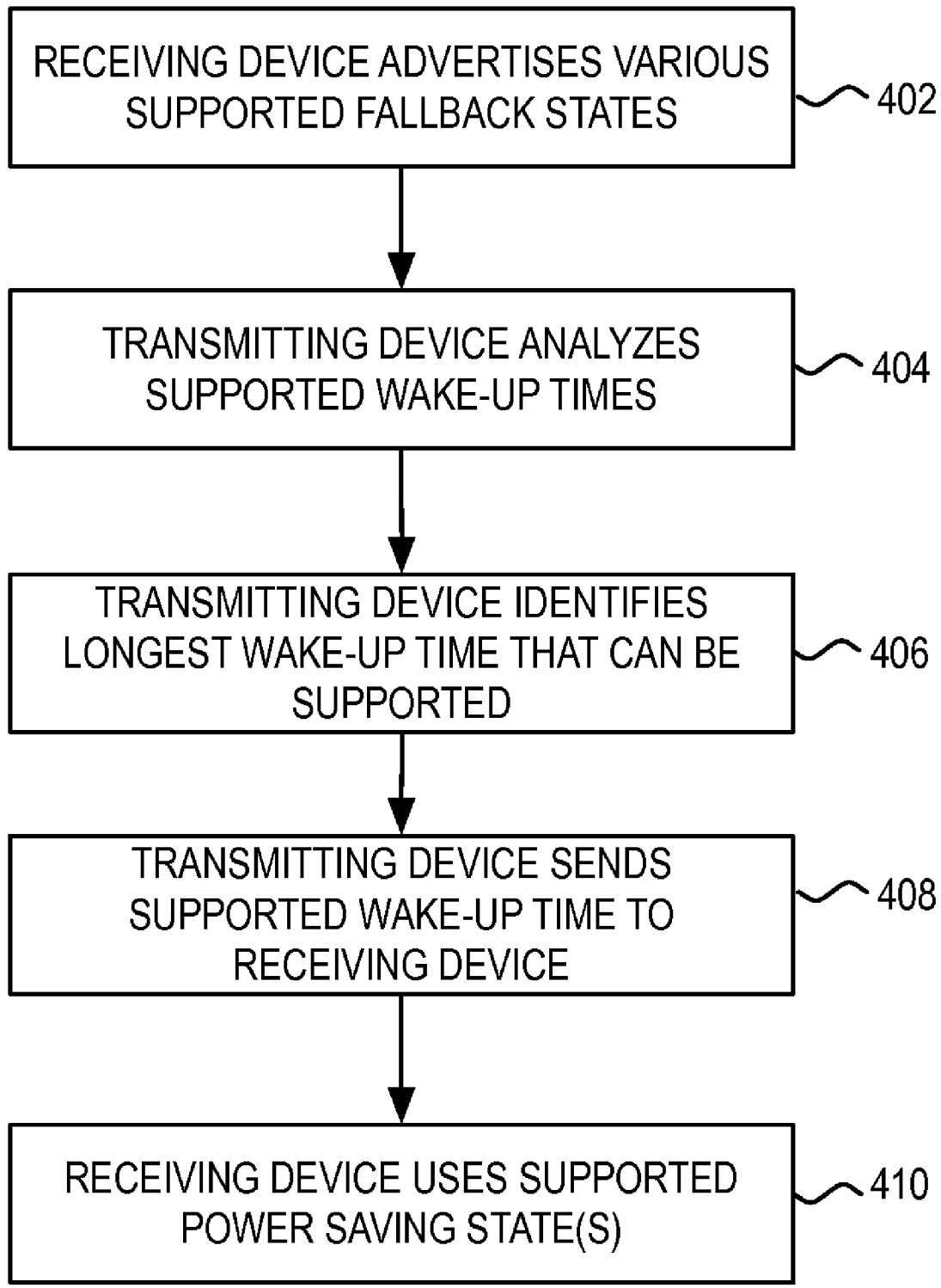
FIG. 4 illustrates a flowchart of a process of the present invention.

To illustrate the use of fallback states in the present invention, reference is now made to the flowchart of FIG. 4. As illustrated, the process begins at step 402, where a receiving device advertises various supported fallback states to an allocating device. In general, this communication can be performed using a Layer 2 frame (e.g., LLDP, IP, or any other network packet). In another embodiment, Layer 3 communication can be used. In another embodiment, management information base (MIB) based functions enabled using the Simplified Network Management Protocol (SNMP) can be used.

Figure 5:
FIG. 5 illustrates an example of a LLDP Data Unit.

In one embodiment, the messaging can be based on formatted TLVs (type-length-value) that are defined for communication of EEE parameters. The formatted TLVs can be carried within a LLDP frame that consists of an LLDP Data Unit (LLDPDU). As illustrated in FIG. 5, the LLDPDU is constructed from mandatory TLVs and optional TLVs. The mandatory TLVs are Chassis ID, Port ID, and Time To Live (TTL) TLVs. Optional TLVs can be TLVs such as the EEE TLV.

In general, the EEE TLV enables the receiving device to advertise their supported power saving states. In one embodiment, the attributes of the EEE TLV can be used to advertise how quickly the receiving device can wake up from each power saving state. Here, the receiving device can advertise wake-up time information for 1 to N fallback states.

In one embodiment, the TLV sent by the receiving device would contain the parameter Tw_sys_rx, which represents the receiving device's wake-up time for a particular power saving state. Multiple Tw_sys_rx parameters can be provided in one or more TLVs to identify the various fallback power saving states that the receiving device can support.

Figure 6:
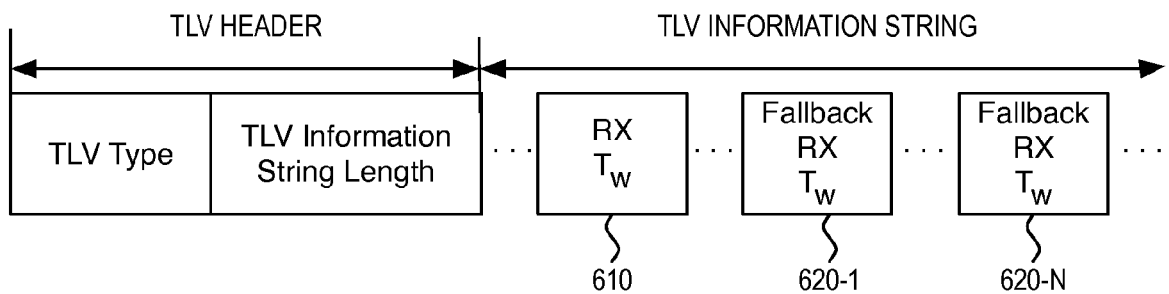
FIG. 6 illustrates an example of a formatted TLV (type-length-value) that includes fallback state information.

FIG. 6 illustrates an embodiment of an EEE TLV that contains fallback state information. As illustrated, the EEE TLV includes a header portion and an information string portion. The header portion contains TLV type information and TLV information string length information. Included within the TLV information string is receive (RX) $T_w$ field 610, which contains the wake-up time (e.g., expressed in microseconds) that the receiving link partner is requesting the transmitting link partner to wait before it starts transmitting data following the power savings state. In addition to the RX $T_w$ field 610 are one or more fallback RX $T_w$ fields 620-1 to 620-N. Each of these fallback RX $T_w$ fields 620-1 to 620-N can be used to advertise wake-up times for additional power saving states implemented by the receiving link partner.

In one embodiment, the inclusion of the same value to RX $T_w$ field 610 as well as to the one or more fallback RX $T_w$ fields 620-1 to 620-N would signify that no fallback states are being implemented. More generally, the duplication of a value to multiple fields can be used to signal that a fallback state associated with a duplicated field is not defined. For example, assume that four fallback RX $T_w$ fields are defined. If only two unique values are included in those four fallback RX $T_w$ fields, then the transmitting link partner would know that only two fallback power saving states are supported by the receiving link partner.

In another embodiment, an additional field can be defined that advertises the number of fallback RX $T_w$ fields that are included in the TLV.

Significantly, the inclusion of parameters for multiple fallback power saving states in a single LLDPDU is advantageous in that it increases the efficiency of the negotiation process. If a parameter for only one power saving state was transmitted in each LLDPDU, then multiple LLDPDU transmissions would be needed to optimize the power saving state that the receiving device will use. The extensive overhead needed in these multiple LLDPDU transmissions (i.e., mandatory TLVs and non-EEE TLVs) represent a large inefficiency in the negotiation process.

At step 404, the transmitting device would then analyze the received information for the one or more fallback states. For example, the transmitting device can analyze the plurality of wake-up times that were returned by the receiving device in the LLDPDU. This analysis would identify the different optional power saving states that can be used by the receiving device.

At this point, the transmitting device would have knowledge of the maximum power saving state that the receiving device desires to use as well as the fallback power saving states that the receiving device is willing to use if the maximum power saving state is not supportable by the transmitting device.

At step 406, the transmitting device would then identify the longest wake-up time that can be supported by the transmitting device on that port. If this longest wake-up time that can be supported is greater than or equal to the wake-up time for the maximum power saving state of the receiving device, then all power saving states in the receiving device are supported by the transmitting device. The transmitting device can then choose to retain any excess allocation. If the longest wake-up time that can be supported is less than the wake-up time of the maximum power saving state, then only some of fallback power saving states can be used by the receiving device.

An indication of this longest supported wake-up time is then transmitted by the transmitting device to the receiving device at step 408. In one embodiment, the longest supported wake-up time is transmitted using a TLV that contains the parameter Tw_sys_tx, which represents the wake-up time that is allocated to the receiving device. Finally, at step 410, the receiving device uses the allocated wake-up time to identify the one or more power saving states that are supported by the transmitting device. These one or more power saving states are then made available to the EEE control policy that controls the energy savings at the receiving device.

As has been described, the principles of the present invention enables the use of multiple fallback power saving states to identify the set of power saving states that are available to the receiving device. Through a port-specific allocation by the transmitting device, a set of supported power saving states can be identified, which can represent a subset of all power saving states available to the receiving device.

An advantage of the present invention is that it enables an identification of an optimal pairing between a power saving state used by the receiving device and an allocation of buffering by the transmitting device. This prevents over-allocation of buffering at the transmitting device and under-utilization of power savings at the receiving device.

To illustrate the prevention of over-allocation of buffering, assume that the receiving device has a 30 µs wake-up time for the PHY, a 100 µs wake-up time for the PHY/MAC interface, a 1 ms wake-up time for the PCI express, and a 2 ms wake-up time for the Southbridge. If the transmitting device can only support a wake-up time of 190 µs for that particular port, then the transmitting can accommodate only the PHY and PHY/MAC power saving states. Since the transmitting device knows the wake-up time of the PHY/MAC power saving state is 100 µs, the transmitting device can retain the excess allocation of 90 µs and indicate to the receiving device that the transmitting device can support a wake-up time of 100 µs. An over-allocation of buffering is thereby prevented.

Another advantage of the present invention is that it enables efficient down-allocation. Since the transmitting device is aware of the various fallback power saving states advertised by the receiving device, the transmitting device can intelligently down-allocate the supported wake-up time without renegotiation by transmitting a new supported wake-up time to the receiving device. This new supported wake-up time can be chosen to accommodate a lower power saving state that is available to the receiving device.

Yet another advantage of the present invention is that it provides EEE-device manufacturers an incentive to consider the design of multiple power saving states beyond those that are standardized. The flexibility of the negotiation process allows for the design of a custom set of power saving states, whose use is simply dependent on the potential allocation of the transmitting device.

It should be noted that the principles of the present invention can be applied to various EEE control policies, regardless of the particular implementation in the stack. Further, it should be noted that the principles of the present invention are not dependent on the particular communication protocol across the link. Any communication protocol that can advertise parameters associated with multiple fallback states can be used. Also, the principles of the present invention can be used to accommodate power saving states available with cascaded interfaces.

As would be appreciated, the principles of the present invention can be used with various port types (e.g., backplane, twisted pair, optical, etc.) as well as standard or non-standard (e.g., 2.5 G, 5 G, 10 G, etc.) link rates, as well as future link rates (e.g., 40 G, 100 G, etc.).

It should also be noted that the principles of the present invention can be applied to symmetric or asymmetric applications of EEE. In a symmetric application of EEE, both directions of the link would transition between various power consumption modes in a coordinated fashion. In an asymmetric application of EEE, the two directions of the link would transition between various power consumption modes independently.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. An Ethernet method, comprising:
   receiving wake-up time information for a plurality of power savings states that are supported by a link partner, wherein said wake-up time information represents an amount of time said link partner would need to transition from a power savings state to an active state;
   determining, based on said received wake-up time information, which of said plurality of power savings states can be supported; and
   transmitting an allocated wake-up time to said link partner, said allocated wake-up time identifying which of said power savings states in said link partner are supported.

2. The method of claim 1, wherein said receiving comprises receiving a link layer discovery protocol data unit.

3. The method of claim 1, wherein said receiving comprises receiving via a Layer 3 protocol.

4. The method of claim 1, wherein said determining comprises analyzing an amount of buffering that is allocated to a port coupled to said link partner.

5. An Ethernet method, comprising:
   transmitting, to a link partner, wake-up time information for a plurality of power savings states that are supported, wherein said wake-up time information represents an amount of time needed to transition from a power savings state to an active state;
   receiving, from said link partner, a wake-up time that has been allocated by said link partner; and
   upon detection of a low link utilization condition, transitioning to a power savings state that supports said allocated wake-up time.

6. The method of claim 5, wherein said transmitting comprises transmitting a link layer discovery protocol data unit.

7. The method of claim 5, wherein said transmitting comprises transmitting via a Layer 3 protocol.

8. The method of claim 5, further comprising selecting from a plurality of power savings states that are supported by said allocated wake-up time.

9. A method in an Ethernet device, comprising:
   receiving, from a link partner of the Ethernet device, information associated with a plurality of power savings states that are available to said link partner;
   determining, based on said received information, a subset of said plurality of power savings states that the Ethernet device can support; and
   transmitting information to said link partner, said transmitted information enabling identification of said subset of said plurality of power savings states that can be used by said link partner.

10. The method of claim 9, wherein said receiving comprises receiving a link layer discovery protocol data unit.

11. The method of claim 9, wherein said receiving comprises receiving via a Layer 3 protocol.

12. The method of claim 9, wherein said receiving comprises receiving wake-up times for said plurality of power savings states.

13. The method of claim 9, wherein said determining comprises analyzing an amount of buffering that is allocated to a port coupled to said link partner.

14. The method of claim 9, wherein said transmitting comprises transmitting a wake-up time allocated to said link partner.

* * * * *